Sept. 10, 1929.   R. C. HOYT   1,727,881
ELECTRIC LIQUID HEATER
Filed June 22, 1927   3 Sheets-Sheet 1
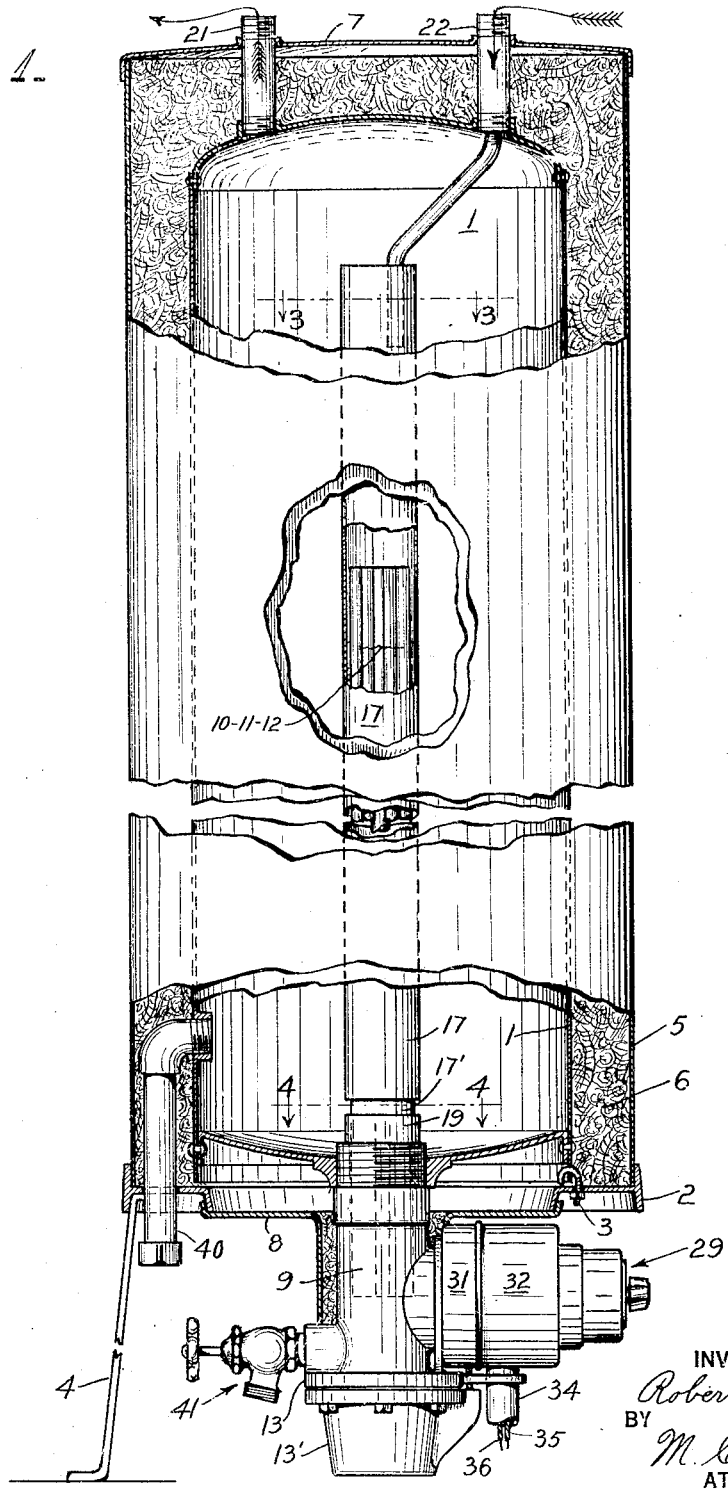

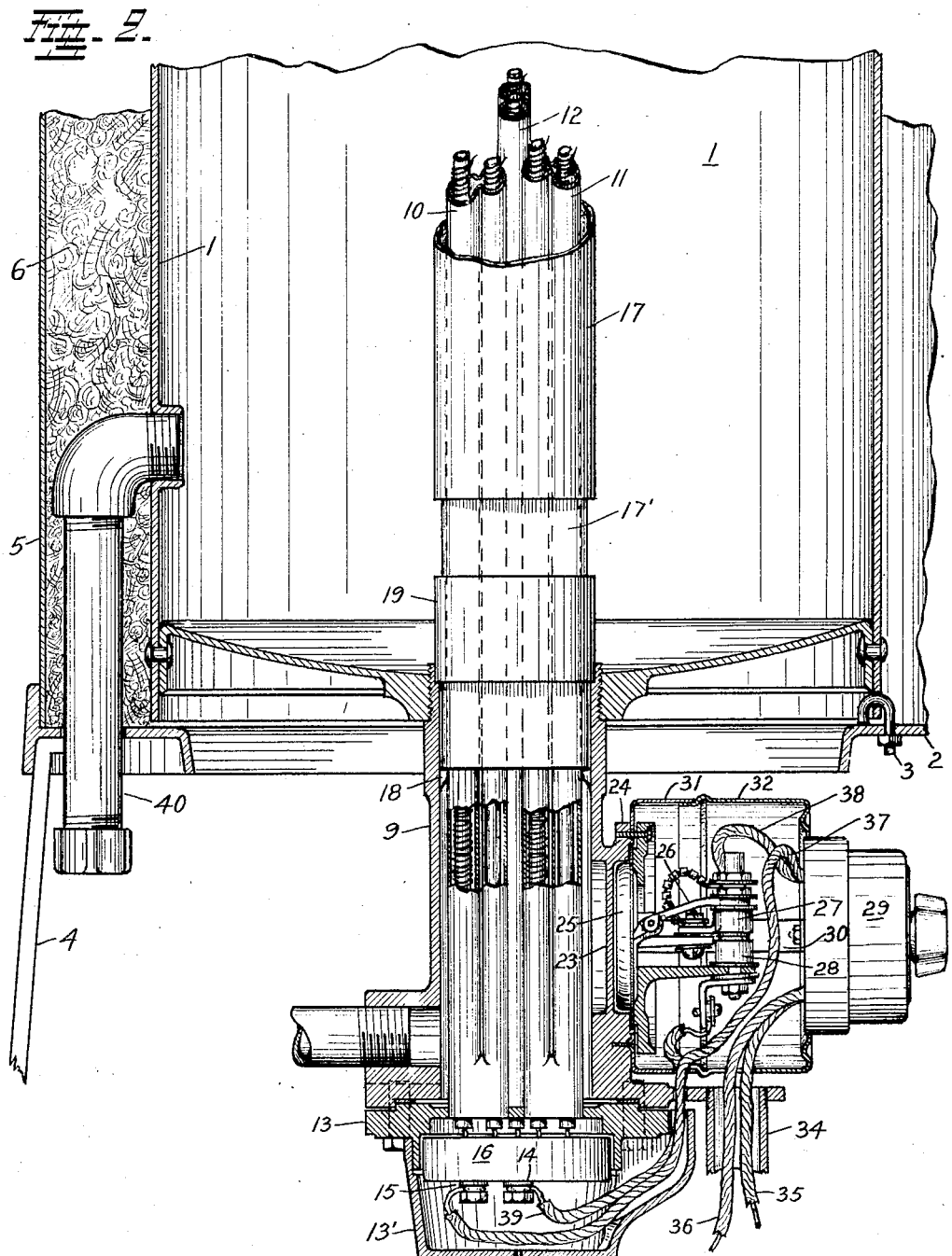

Sept. 10, 1929.  R. C. HOYT  1,727,881
ELECTRIC LIQUID HEATER
Filed June 22, 1927  3 Sheets-Sheet 3
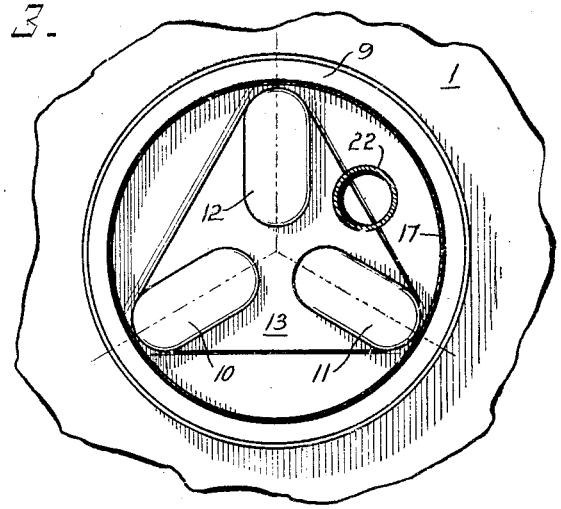
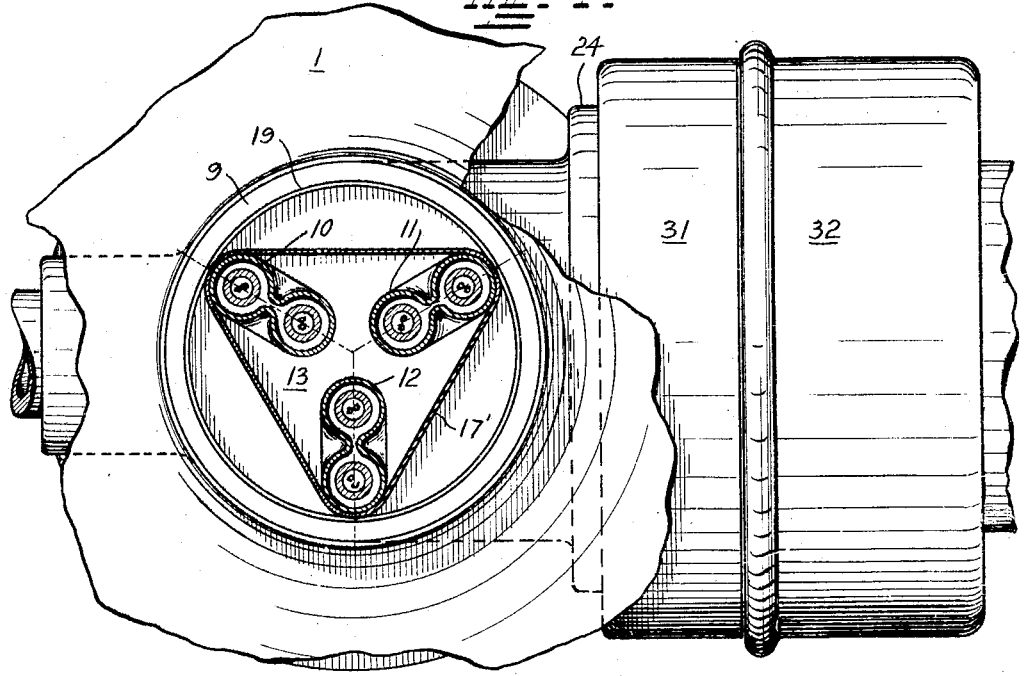
INVENTOR
Robert C. Hoyt
BY
M. C. Frank
ATTORNEY Patented Sept. 10, 1929.

1,727,881

UNITED STATES PATENT OFFICE.

ROBERT C. HOYT, OF OAKLAND, CALIFORNIA.

ELECTRIC LIQUID HEATER.

Application filed June 22, 1927. Serial No. 200,655.

My invention relates especially to water heaters employing electric heating units.

It is an object of my invention to provide a generally improved electric liquid heater.

It is an object of my invention to provide for greater heating capacity than has heretofore been common in electric water heaters; and to provide this increased capacity with minimum overall dimension of heating member. It is an object of my invention to design a compact heating member for electric heaters in general, and for water heaters in particular; and it is a further object of my invention to design a water heater best adapted to incorporated such a member. It will be understood of course, that compactness of an electric heating member is limited by difficulties of effective heat transfer therefrom. It is an object of my invention to provide a relatively small heating member having a large exposed surface; particularly a maximum of outwardly-directed exposed radiating surface, whereby heat transfer is facilitated.

It is an object of my invention to prevent destructive overheating of the electric heating units of a heater; especially of a water heater.

It is desired principally to decrease the overall lateral dimension of the heating member, and it is an object of my invention to provide special means in a storage water heater which permits the heating member to be increased in length beyond what had heretofore been considered good practice. It is an object of my invention to prevent overheating of the water at the upper part of a heater employing a tall heating member.

It is an object of my invention to prevent all local overheating of water in an electric water heater, whereby bumpy action and scale formation is minimized. In furtherance of this object, it is desired to avoid closely opposed heating surfaces leaving a thin film or core of water to be heated on both sides; and it is further desired to avoid dead water space next to the heating units.

It is an object of my invention to teach an improved way of grouping of heater units; and it is a further object to provide an improved placement of these units in a liquid heater. It is an object of my invention to provide for rapid circulation of liquid past the heating elements of a liquid heater.

It is an object of my invention to provide an electric heater member which is readily removable from the water heater, and all parts of which are readily accessible.

It is a further object of my invention to provide an improved electric manual-thermostatic switch unit for electric water heaters.

Other objects of my invention are concerned with improvements in structural features of the device of my invention.

Other and ancillary objects of my invention will be suggested in the following description and in the use of the device of my invention. Certain of the objects or certain portions or combinations of the objects of my invention may be attained with the use of less than all its advantageous features, or with modifications within its purview. It is petitioned therefore, that my invention be limited only by the claims constituting its final determination.

Referring to the drawings:

Figure 1 is a composite front elevation and vertical mid-section of a water heater embodying my invention. The section is formed by progressively breaking away the outer layers to disclose the interior of the heater. The figure is foreshortened to about half its nominal height for purposes of illustration.

Fig. 2 is a magnified central vertical section of the lower part of the heater, detailing certain of the electrical features not illustrated by Fig. 1.

Figs. 3 and 4 are magnified fragmentary sectional plans detailing the electric heating member of the water heater. The plane of section of Fig. 3 is at the upper part of the heater, and is indicated by a line 3—3 in Fig. 1. The plane of section of Fig. 4 is at the lower part of the heater, and is indicated by a line 4—4 in Fig. 1.

A hot water storage tank 1, of conventional design, is secured to an annular base casting 2 by bolt hooks 3; the base casting being supported as desired by legs 4, or a wall bracket (not shown). The periphery of the base casting extends out beyond the tank, and is flanged to retain a sheet-metal jacket 5 in spaced relation to the tank; the space between the tank and jacket being stuffed with heat-insulating material 6. Top and bottom covers 7 and 8 are fitted to completely enclose the tank with insulation.

The bottom of the tank 1 is provided with a large central opening through which electric heating units may be inserted. The opening is threaded to receive the threaded upper end of a pipe-like casting 9 adapted to support the heater units.

An electric immersion heater member 10—11—12 comprising separate units 10, 11, and 12, is provided to heat the water in the tank. Immersion heater units of any well-known type may be employed, but the preferred type of unit is a duplex oblong-sectioned tube of irregular cross-section and having a large exposed surface; there being two electric resistance elements within each element. Duplex units of this type are described in detail in Patent #1,476,335 issued Dec. 4, 1923, to W. W. Hicks et al. My invention deals particularly with the positioning and arrangement of the heating units in the heater, and is not limited to any one preferred specific type of unit. The shape of unit is important, and though it would be possible to realize certain of the advantages of my invention with a circular-sectioned unit, oblong shape is decidedly preferable and has been selected.

The units are secured at their lower ends, to a removable bottom flange 13 (see Fig. 2) for the casting 9; the bottom flange serving as a support for the insulating base plate 16, of the units. A bottom cap 13' is provided for the casting 9. Each unit 10, 11, and 12, is secured at its lower end to this bottom flange 13. The longitudinal or vertical axes of the rod-like units are parallel. Being oblong; each unit has a major and a minor transverse or horizontal axis. The two common methods of arranging such units are (1) : to cluster them around the circumference of a circle or other closed figure so that their major transverse axes form a perimeter, or (2) : to arrange them with their major transverse axes parallel to form a grid instead of a cluster. In either case a column of water is enclosed between two opposed heating surfaces and tends to become overheated. One of the important features of my invention is that the heating units are arranged neither parallel nor perimetrically; but radially, to form a spider-like heating member the major heat emitting surfaces of which throw their heat outward. The units 10, 11 and 12 are secured to the base-plate 16 with their major transverse axes radially disposed in a Y-shaped or cloverleaf cluster, (see Fig. 4).

The units project vertically from the base of casting 9 to a point substantially above the middle of the heater; thus permitting large electrical capacity without undue lateral spreading of the heater units. In the ordinary water heater it would be disadvantageous to extend the heating units appreciably above the lower part of the heater, due to likelihood of overheating at the top while leaving an insufficiently heated body of water at the bottom of the heater. This disadvantage has been entirely overcome by jacketing the units. A cylindrical sheet-metal sheath 17 surrounds the elements and has its lower end 17' molded to triangular shape to fit the Y-shaped cluster of heating units so that the horizontal major axis of each oblong unit bisects one angle of the triangular lower portion of the sheath (see Fig. 4). The lower end of the sheath thus fits tightly over the cluster of heating units, while leaving a convection passage around each unit. The lower end of the sheath fits within the cylindrical casting 9 so that a second convection passage is formed between the sides of the triangular sheath, and the inner circumference of the casting. A lug 18 (Fig. 2), within the casting 9 supports the base of the sheath 17' above the base of the casting; the triangualr section of the sheath being long enough to extend appreciably above the top of the casting. Thus, a convection passage is formed from the lower part of the tank into the casting, down, and up into the inside of the sheath. A cylindrical ring 19 is adapted to fit closely over the triangular portion of the sheath and tightly within the upper portion of the casting 9; and a shoulder on the inside of the casting, supports the ring so that its top edge is above the bottom of the tank 1. The ring constitutes a sediment guard; preventing sludge at the bottom of the tank from being circulated continually through the heater.

The casing 17 extends above the top of the heating units to near the top of the tank 1; forming a convection passage for the heater. The circulation of water is constrained to an area closely surrounding the heating units and thus serves to more effectively absorb the heat therefrom; while preventing deposition of boiler scale on the units. The avoidance of scaling is attained by the rapid circulation which prevents localized overheating of water with the attendant precipitation of scale, and also by the stirring action of the circulation which prevents solid particles from settling on the surfaces of the units.

A hot water outlet 21 for the heater is provided at the top of the tank 1. The cold water inlet pipe 22, for the heater, terminates within the upper part of the casing 17, and the entering cold water reverses the circulation through the heater every time hot water is withdrawn therefrom. This arrangement accelerates response of the thermostat, prevents chilling the main body of water in the tank by mixing with untempered cold water, and tends to fracture and wash out any boiler scale which might adhere to the heating units.

It is especially to be noted that the rising column of water being heated is at no portion of its section exposed to opposed heat radiation from both sides. The heating units are radially disposed so that all the heat is radiated outward. This is to be contrasted from a group of heating units arranged around the circumference of a circle; i. e. arranged perimetrically. In the perimetric arrangement a column of water is enclosed within the group of units, is heated from all directions, and has no satisfactory connection to the main body of liquid. In the perimetric arrangement, this dead body of water is overheated causing scaling and boiling or "bumping," and conversely the heating units are insufficiently cooled and tend to burn out. While particularly adapted to immersion liquid heaters, I believe the non-perimetric clustered or radiating arrangement of units herein illustrated, to be more broadly applicable to heat radiators of other types, and desire to be limited only by the claims to this feature of my invention.

Thermostatic switch means are provided for controlling the water storage temperature. A thermostatic switch of any well-known construction may be employed such as the thermostatic switch described in Patent #1,532,903, issued to A. J. Kercher, April 7, 1925. The present invention is particularly concerned with the placement of the thermostat in the heater. A side wall of the casting 9 is expressed to form a thin circular projection 23 near the bottom thereof, and a bolting flange 24 is formed outside of this projection. A thermostat 25 of the buckling-diaphragm type is bolted to this flange, and is adapted to actuate the flipper lever 26 of a switch 27—28 in series with the heating elements. It is particularly to be noted that the thermostat heat-exchange wall is vertical so that accumulation of sludge thereon is impossible, and that it is placed in a constricted channel to forestall deposition of boiler scale thereon and to insure rapid heat transfer therefrom and thereto. The thermostat; being considerably below the main storage tank does not shut the heater off until every bit of water in the main tank is heated to the required temperature.

An improvement has been effected in the switch control for the heater. It has been past practice to interpose a manually controlled switch in the circuit between the thermostatic switch and the heating elements so that the thermostatic switch could be rendered ineffective. The manually controlled switch has heretofore been placed directly under the heating elements where it was inaccessible and subject to breakage. In the present design, the two switches are combined into a single unit, and both are placed in an accessible position. The manually controlled switch 29 is a standard well-known electric wiring device and need not be described in detail. The switch 29 is secured to and supported by a pair of arms 30 (only one of which is shown in Fig. 2). The arms 30 are bolted to the member 31 of a two-part casing 31—32. The member 31 is in turn bolted directly to the flange 24 at the rim of the thermostat 25, so that the whole is removable as a unit from the heater. The two part casing 31—32, encloses the space between the switch 29 and the thermostat 25; the portion 32 of the casing, being removable to expose the operating mechanism. Instead of connecting the thermostatic switch ahead of the manual switch, the wiring has been reversed so that when the manual switch is "off" the entire thermostatic switch becomes dead and may be handled safely. The current is supplied through a cable 35—36 entering the heater through a conduit 34 and a hole in the bottom of the casing 32. The two leads 35 and 36, (assuming a two wire circuit) issuing from the cable 35—36 first enter the double-pole manually controlled switch 29, and are connected to two terminals thereof. Wires 37 and 38 lead from the other two terminals of the switch 29. The wire 37 leads directly to one terminal 15 of the electric heating unit. The other wire 38 leads to one terminal 27 of the single-pole thermostatically controlled switch 27—28; from which latter switch a wire 39 leads to the other terminal 14, of the heating units. While the described electric wiring is specific to a single-pole thermostatic switch and double-pole manual switch, it is obviously adaptable to various combinations of single pole, multi-pole, and multi-heat switches as well; the essential prescription being that the manually-controlled switch precede the automatic switch in the line.

A flush-out conduit 40 is provided near the base of the tank 1, and a drain cock 41 at the bottom of the casting 9.

I claim:

1. A spider-like electric heating member comprising a clustered group of separate units disposed substantially radially, and an imperforate tubular heat-conducting sheath enclosing and contacting each of said units solely along a single outer line thereof.

2. In a liquid heater, a heating member comprising a group of not less than three oblong-sectioned electric heating segments symmetrically spaced in a non-perimetric cluster, and a tubular sheath enclosing said cluster and contacting the segments whereby a passage of spider like-section is defined within the sheath.

3. In a liquid heater, a heating member comprising a plurality of rod-like electric heating units symmetrically grouped in mutually spaced relation, a tubular sheath enclosing said units and defining a fluid passage therealong, and a tubular casing enclosing said sheath and cooperative therewith to define a passage along the outside of said sheath.

4. In a liquid heater, a heating member comprising a plurality of rod-like heating units symmetrically grouped in mutually spaced relation and with their longitudinal axes parallel, a tubular sheath enclosing said units and contacting the same along an outer side thereof, said sheath having a lower portion of triangular section, and a tubular casing of circular section enclosing said triangular sheath portion and cooperating therewith to define a fluid passage therealong.

5. In combination with a liquid heater providing a storage tank having a cylindrical sump in the bottom thereof, a heating element extending through and upwardly from said sump, and a tubular sheath engaged with the bore of said sump and about said element to provide a fluid passage therealong, said sheath cooperating with the bore of said sump to define a fluid passage between itself and said bore.

6. In combination with a liquid heater providing a storage tank having a cylindrical sump depending from the bottom thereof, a heating element extending through and upwardly from said sump and a tubular sheath enclosing said element to provide a fluid passage therealong and cooperating with the sump bore to define a fluid passage between itself and said bore, the lower end of said sheath lying within the sump and above the bottom thereof whereby said passages are connected within the sump.

In testimony whereof, I affix my signature.

ROBERT C. HOYT.